Jan. 22, 1957　　　R. A. HOLLOWAY　　　2,778,916
HUMIDIFIER FOR ELECTRIC HEATERS
Filed May 7, 1954
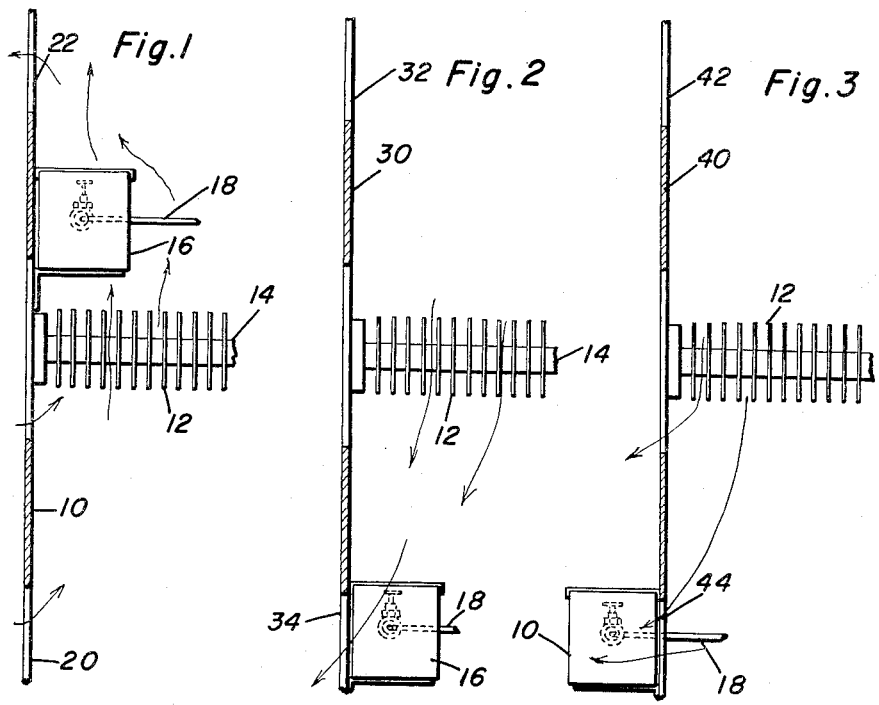
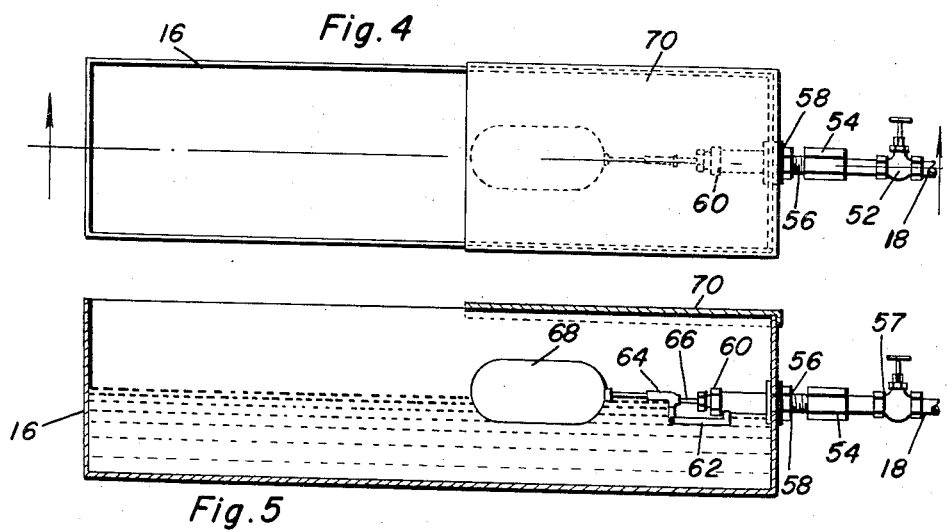
Robert A. Holloway
INVENTOR.

United States Patent Office 2,778,916
Patented Jan. 22, 1957

2,778,916

HUMIDIFIER FOR ELECTRIC HEATERS

Robert A. Holloway, Mayfield, Ky.

Application May 7, 1954, Serial No. 428,188

1 Claim. (Cl. 219—38)

This invention relates to a humidifier for an electric heater and particularly to a humidifier to supply moisture to the hot air produced by a resistance-type heater and having means for causing the flow of air from the heater to the humidifier.

As is well known when heat is applied to a space the comfort of the persons therein is greatly controlled by the humidity of the air. When comparatively cold air is introduced into a building humidity is quite low because the moisture has been frozen or condensed therefrom. Consequently, when the air is heated by any suitable means such as an electric heater the air will be quite dry so that persons in the space being heated will be uncomfortable because of the dryness of the air.

The present invention provides a system for humidifying electrically heated air so that the humidity may be raised to the desired level.

In the construction according to the invention, a water trough is placed in proximity to a resistance-type heater and any suitable means is provided for causing the flow of hot air from the electric heater into evaporating relation with the water in the container. Preferably the container is provided with a constant flow of water from a suitable source which is controlled by means of a level-responsive valve and a cover is placed over that portion of the container so that the level-responsive valve will not be tampered with.

It is accordingly an object of the invention to provide an improved humidifier.

It is a further object of the invention to provide a humidifier particularly adapted to be utilized with an electric heating element.

It is a further object of the invention to provide a heating system providing electrically heated humidified air.

Other objects and many of the attendant advantages of the present invention will be apparent from the following detailed description taken in conjunction with the accompanying drawing, in which:

Figure 1 is an elevation partially in section of an electric heater according to the invention;

Figure 2 is a modification showing the utilization of a fan to cause the air flow from the heater to the humidifier;

Figure 3 is a similar view of a further modification according to the invention;

Figure 4 is a top plan view of the humidifier element according to the invention; and Figure 5 is a vertical sectional elevation through the humidifier element according to the invention.

In the exemplification according to the invention a heater comprises a suitable container indicated at 10 and having a heating element 12 mounted therein on any suitable means such as the insulating core 14. A container 16 is placed in proximity to the heating element 12 and water is supplied thereto by means of a suitable conduit 18.

In the construction according to Figure 1, the container 10 is provided with a plurality of apertures 20 through which fresh air or recirculated air may be introduced into the heater so that the air will flow upwardly past the heating elements 12 and flow into proximity with the container 16 so that not only will the container 16 be warm to cause evaporation of hot water from the container but the air will pass in proximity to the top of the water in the container so that air will entrain the moisture adjacent the surface of the water so that it will be passed along as humidity in the air. The heated stream of humidified air will pass outwardly through the apertures 22 and be delivered to the space to be heated in any desired manner.

In the modification according to Figure 2, a container 30 is provided with intake apertures 32 adjacent the top thereof so that air will flow downward past the heating elements 12 and impinge on the top of the water in the container 16 which is mounted at the lower portion of the heater so that the air will impinge upon the surface of the water and pass outwardly through the apertures 34 to be delivered to the space to be heated in any desired manner.

In the exemplification according to Figure 3 the heater 40 is provided with upwardly positioned intake apertures 42 so that the air will be forced downwardly over the heating elements 12 and pass out through the louvers into engagement with the fluid in the water tank 10 which will be placed on the outside of the heater so that it may be readily accessible.

The humidifier according to the invention comprises an elongated trough-like container 16 which is preferably substantially rectangular in section herein indicated as substantially square in cross-section while it is relatively narrow in length. The water supply conduit 18 is provided with a hand-controlled valve 52 which is coupled by means of a suitable union 54 with a nipple 56 which is sealed in fluid-tight relation through one wall of the container 16 by means of the packing nut 58.

The nipple 56 is provided with a float controlled valve 60 to which is connected a pivoted arm 62 on which is mounted a control lever 64 which contacts the valve stem 66 and valve stem 66 is then operated in response to the position of the float element 68.

In order to protect the valve 60 and the operating mechanism thereof, a partial cover 70 is placed over a portion of the container 16 so that the float and the valve mechanism will be shielded from accidental contact of various items thereabout. However, the larger portion of the container 16 has the substantially open top so that the flow of air thereby will readily impinge on the surface of the water and carry away any water vapor adjacent thereto.

The container 16 may be constructed of any desired material such as ceramic or metallic but is preferably formed of welded copper as such material is substantially corrosion resistant in the presence of various mineral and other contaminations in the water.

In the operation of the device according to the invention, the electric elements 12 will be energized to produce heat and the air flow may be either natural as shown in Figure 1 in which the air will rise upwardly past the heating elements into contact with the humidifier and carry away the evaporated water therefrom. It is apparent that the valve 52 must be open so that the valve 60 will admit water into the container 16 as it is evaporated. When a reverse flow is produced the humidifier may be either in or outside of the heater as may be desired and the heated air will be caused to flow downwardly and impinge on the surface of the water to carry away any vapor adjacent thereto.

For purposes of exemplification a particular embodiment of the invention has been shown and described according to the best present understanding thereof. However, it will be apparent to those skilled in the art that various changes and modifications may be made in the construction and arrangement of the parts thereof without departing from the true spirit and scope of the invention.

What is claimed as new is as follows:

A humidifier comprising an open elongated trough-like container adapted to be mounted on the interior of a casing wall having vertical spaced apertures for circulation of air past the container, a water supply conduit communicating with said container, a float operated valve in said conduit, a float in said container operatively connected to said valve for maintaining a constant water level in said container, a partial closure on said container in overlying relation to the float and valve for protecting the same, said partial closure leaving the major portion of the container open for exposing the surface of the water contained therein to the circulating air, an electric heating element supported on the casing wall below the container, said heating element forming the sole means for producing air flow over the water surface and for heating the water whereby the air will entrain moisture vapor from the water.

References Cited in the file of this patent

UNITED STATES PATENTS

| | | |
|---|---|---|
| 1,154,113 | Hadaway | Sept. 21, 1915 |
| 1,668,707 | Allen | May 8, 1928 |
| 1,880,973 | Myers | Oct. 4, 1932 |
| 1,982,418 | Carmichael | Nov. 27, 1934 |
| 2,236,359 | Armstrong | Mar. 25, 1941 |